Aug. 4, 1964            J. L. PAYER            3,143,320

SINGLE-AXIS AUTOPILOT FOR AIRCRAFT

Filed Oct. 29, 1962

INVENTOR.
JOHN L. PAYER 3,143,320
SINGLE-AXIS AUTOPILOT FOR AIRCRAFT
John L. Payer, 124 W. Pershing, Santa Maria, Calif.
Filed Oct. 29, 1962, Ser. No. 233,974
1 Claim. (Cl. 244—78)
(Granted under Title 35, U.S. Code (1952), sec. 266)

The invention described herein may be manufactured and used by or for the Government of the United States of America for governmental purposes without the payment of any royalties thereon or therefor.

The present invention relates to a device for controlling the attitude of an aircraft about its fore-and-aft axis, and, more particularily, to a single-axis autopilot for precluding the departure of such aircraft from a level flight condition.

At the present time many different types of automatic pilots are known, a large majority of which operate on the gyroscopic principle. The gyro unit usually incorporates a rotor which is erected and spun by a jet of air. Such a system obviously requires a source of compressed air as well as a distribution network connecting the source to the gyro per se. The system accordingly is not only complex in construction but of considerable overall weight. Furthermore, all gyros are subject to precession, which may be of sufficient magnitude to render the entire assembly inoperative or adversely affect the accuracy of its operation.

During flight, the various aerodynamic surfaces of an aircraft have different pressures developed thereon. For example, the pressure on the under surface of each wing exceeds that present on the upper surface, and it is this pressure differential which maintains the aircraft in flight. When the attitude of the aircraft is such that the wings are level, the respective pressures on corresponding areas of each wing are substantially identical. However, if the attitude of the aircraft about its longitudinal axis is other than level, such equality of pressure no longer exists. For example, if one wing is higher than the other, the pressure upon the upper surface of the raised wing will be reduced because of the increased lift. In other words, as the aircraft departs from a level condition, the pressure upon the upper surface of the raised wing will be less than the pressure on the upper surface of the lowered wing. It has been found that this pressure differential, which is developed during any departure along the aircraft "roll" axis from level flight, may be employed to bring about a compensating action effective to restore the attitude of the aircraft to its original level condition.

One object of the present invention, therefore, is to provide an extremely simple form of a single-axis autopilot for aircraft.

Another object of the invention is to provide a wing-levelling apparatus for aircraft which makes use of the unequal pressures developed on corresponding areas of the aircraft wings during other than level flight.

An additional object of the invention is to make use of the pressure differential developed on corresponding areas of the aircraft wings during a departure from level flight to energize a prime mover which actuates the aircraft ailerons in such a direction as to compensate for the departure of the aircraft from its original attitude.

Other objects and many of the attendant advantages of this invention will be readily appreciated as the same becomes better understood by reference to the following description when considered in connection with the accompanying drawings wherein.

Figure 1:
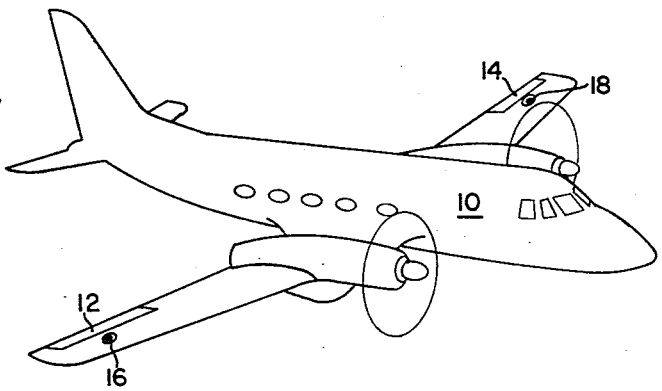
FIG. 1 is a perspective view of an aircraft on which a preferred embodiment of the present invention has been installed.

In FIG. 1 of the drawings is illustrated an aircraft generally designated by the reference numeral 10. In the usual fashion, the right wing of aircraft 10 is provided with an aileron 12, and the left wing with an aileron 14, which are normally operated by conventional power equipment (not shown) when under the manual control of the aircraft pilot. Also mounted on each wing of the aircraft 10 is a so-called "static hole," the function of which will be described in connection with FIG. 2. However, it may be mentioned at this point that the right-wing static hole 16 is located on the upper wing surface in an area of reduced pressure and just forward of the aileron 12. In similar fashion, the left-wing static hole 18 is located on the upper wing surface just forward of the aileron 14.

The two static holes 16 and 18 are illustrated in FIG. 1 as comprising openings in the wing's upper surface at locations where the pressure, during aircraft flight, is at a relatively low level as compared to the pressure on the wing's under surface. It will be appreciated that if the attitude of the aircraft 10 is such that the wings are level, the pressure developed on each upper wing surface (at the locations where the static holes 16 and 18 appear) will be substantially the same. Any discrepancy between the pressures appearing at these two points is made use of in a manner such as brought out in FIG. 2.

Shown in the drawing is a differential pressure chamber 20 which may merely be a sealed enclosure separated into two portions by a flexible diaphragm 22. A tube or conduit 24 connects the left hand (in the drawing) portion 26 of the pressure chamber 20 to the static hole 18 located on the left wing of aircraft 10. In similar fashion, a conduit 28 connects the right hand portion 30 of the pressure chamber 20 to the static hole 16 located on the right wing of aircraft 10.

The flexible diaphragm 22 is formed of some electrically insulating material such as rubber, and carries on each surface thereof an electrical contact 32. A further conductor (not shown in the drawing, and preferably embedded in the flexible material of which the diaphragm 22 is composed) electrically connects both contacts 32 to an output conductor 34. Positioned within the chamber portion 26 is a further stationary contact 36, which is normally out of electrical engagement with its associated contact 32 as shown. In similar fashion, the chamber portion 30 has positioned therewithin a further stationary contact 38, which is normally out of electrical engagement with its associated contact carried by diaphragm 22. In other words, the pressure chamber 20 and its associated elements is shown in FIG. 2 of the drawing as being in its normal or "pressure-balanced" condition, such condition being that which exists during flight of aircraft 10 when the wings thereof are essentially level with respect to a horizontal plane.

The ailerons 12 and 14 of aircraft 10 are actuated from one position to another by means of a cable 40. This cable 40 is caused to move from right to left (in the drawing) upon limited rotary movement of an arm 42 which is securely affixed to the cable as well as to the shaft 44 of a reversible motor 46. As shown in FIG. 2, this motor 46 receives power from a battery or other source 48 over a conductor 50. In addition, a conductor 52 connects the stationary contact 36 to the motor 46 through a limit switch 54 the function of which will be later described. In a corresponding manner, a conductor 56 connects the stationary contact 38 to the motor 46 through a further limit switch 58. The arrangement is such that upon energization of motor 46, shaft 44 will turn and rotate the arm 42 through a limited angle in either direction as shown by the broken lines, this angular rotation being limited in magnitude by the presence of the limit switches 54 and 58. Since the arm 42 is securely attached to the aileron control cable 40, rotation of arm 42 in the manner above described will actuate the cable 40 to the right or left to selectively raise and lower the aircraft ailerons 12 and 14.

Figure 2:
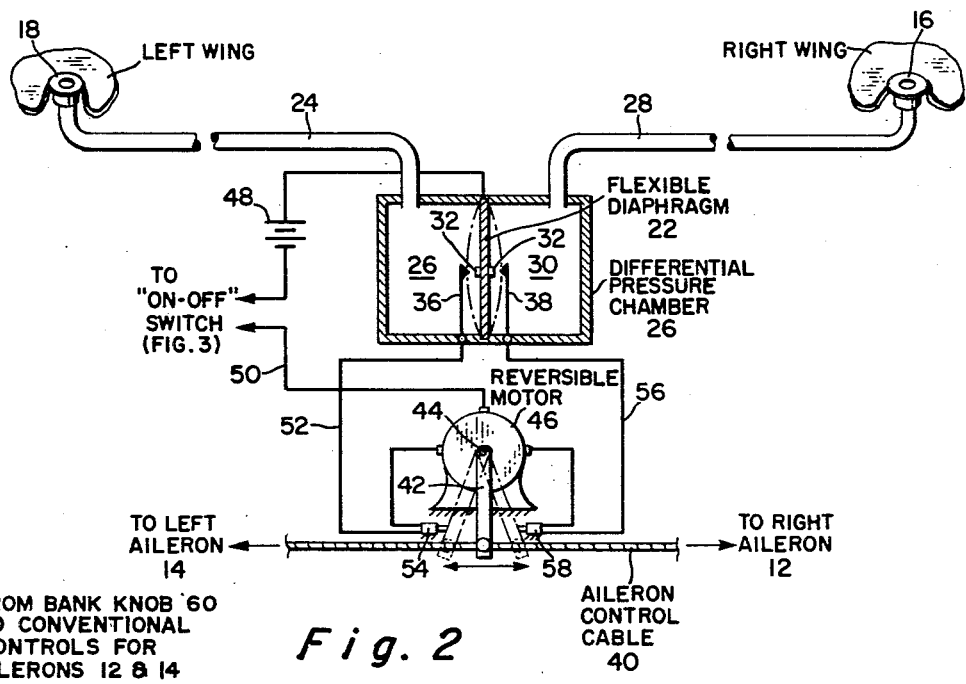
FIG. 2 is a partially schematic representation of a single-axis autopilot designed in accordance with the present concept.

In operation, and assuming the equal-pressure condition shown in FIG. 2, motor 46 is deenergized. However, should the aircraft 10 change its attitude so that the right wing is raised above the left wing (for example), then the increased lift on the raised wing will result in a reduction in pressure at the static hole 16. This reduction in pressure is transmitted through conduit 28 to chamber portion 30, and, if the pressure difference is sufficient, the diaphragm 22 will flex to the right and bring contact 32 into electrical engagement with contact 38. This will establish a circuit through battery 48 and the limit switch 58, the shaft 44 rotating to bring arm 42 into electrical engagement with the limit switch 58. Such rotation of arm 42 actuates the aileron control cable 40 to change the position of the ailerons 12 and 14 in such a direction as to correct (or compensate for) the undesired attitude of the aircraft and restore the latter to its level condition. Upon equalization of the wing pressures, the diaphragm 22 centers to break electric contact with the element 38 and deenergize the motor 46.

The two limit switches 54 and 58 may be set for a certain maximum bank angle (such as 20°) and will deenergize the motor 46 when this maximum is reached. In addition, these switches 54 and 58 act as "stops" for movement of the aileron control cable 40 when the pilot manually actuates the bank knob 60 forming part of the pilot's control box 62 of FIG. 3 even though the motor 46 is deenergized during such manual operation of the bank knob 60.

Figure 3:
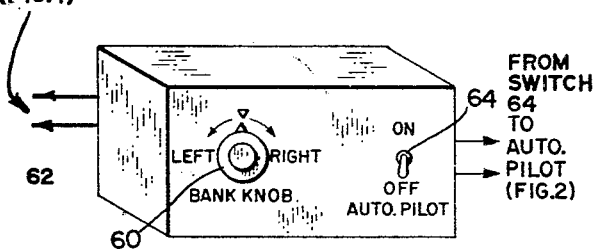
FIG. 3 is a perspective view of a control box intended to be operated by the pilot of the aircraft of FIG. 1.

This manually actuatable unit 62 of FIG. 3 is provided to permit the pilot to bank the aircraft manually by utilizing the aircraft's conventional power equipment when the autopilot of FIG. 2 is not in operation. Inactivation of the autopilot is accomplished by placing a switch 64 in "off" position. When the autopilot is inoperative, the pilot may trim the craft and place it on a desired heading by means of the bank knob 60, which controls the aircraft's conventional aileron-operating esuipment. After this heading has been achieved, the pilot actuates switch 64 to "on" position, at which time the apparatus of FIG. 2 "takes over" and maintains the wings of the aircraft level in the manner above brought out.

Although the pressure-responsive unit 20 is described as including a flexible diaphragm, it will be understood that a device of the bellows type may readily be substituted therefor. Such bellows-type arrangements are now well known in the art, particularly for use in altimeters and rate-of climb instruments.

While a reversible motor has been illustrated and described as the means for actuating the aircraft ailerons in response to changes in pressure at the intake ports 16 and 18, it may be desirable to dispense with such a device and instead utilize the power generated by the aircraft's engine-driven vacuum pumps. In such a case, the flexible diaphragm 22 may be connected to the control arm of a two-way valve which is incorporated in the main line or conduit leading to the vacuum pump. The two output conduits of the valve then respectively lead to the two aileron bellows, and any movement of the valve control arm changes the differential pressures applied to such aileron bellows. Inasmuch as such pressure valves are well known in the art, no detailed description of their operation is deemed necessary.

Obviously many modifications and variations of the present invention are possible in the light of the above teachings. It is therefore to be understood that within the scope of the appended claim the invention may be practiced otherwise than as specifically described.

I claim:

A single-axis autopilot for aircraft, comprising:
(a) a pair of static holes, one hole being located on the upper surface of each aircraft wing in an area where the pressure developed during flight is relatively low;
(b) a closed chamber having two portions separated by a flexible diaphragm;
(c) a pair of conduits respectively connecting said pair of static holes with the two portions of said closed chamber;
(d) means responsive to a flexing of said diaphragm in either direction for closing an electrical circuit;
(e) a prime mover energized when said circuit is closed, the direction of rotation of the shaft of said prime mover being governed by the direction in which said diaphragm is flexed;
(f) means responsive to energization of said prime mover for operating an aerodynamic control surface of said aircraft, said control surface operating means including an arm carried by the shaft of said prime mover, and a cable connected to the ailerons of said aircraft, said arm being connected to said cable;
(g) means for limiting the extent of rotation of said prime mover shaft in either direction, said limiting means comprising a pair of limit switches included in said circuit and acting to deenergize said circuit when the shaft of said prime mover has rotated in either direction through a given predetermined angle; and
(h) means for inactivating said autopilot to permit the operator of said aircraft to trim said craft and place it on a desired heading, following which action the said inactivating means is rendered inoperative so that said autopilot may control said aircraft to maintain the wings thereof essentially level regardless of the aerodynamic forces acting thereon.

References Cited in the file of this patent
UNITED STATES PATENTS

| | | |
|---|---|---|
| 2,420,932 | Cornelius | May 20, 1947 |
| 2,421,149 | Segerstad | May 27, 1947 |
| 2,628,793 | Stalker | Feb. 17, 1953 |